US012691526B2

(12) United States Patent
Stammeier

(10) Patent No.:    US 12,691,526 B2
(45) Date of Patent:        Jul. 28, 2026

(54) METHOD AND DEVICE FOR PRODUCING RECESSES IN THE COATING OF TRANSPARENT COMPONENTS OF A LIGHTING DEVICE

(71) Applicant: Hella GmbH & Co. KGaA, Lippstadt (DE)

(72) Inventor: Alexander Stammeier, Rietberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 593 days.

(21) Appl. No.: 16/513,255

(22) Filed: Jul. 16, 2019

(65) Prior Publication Data

US 2019/0337098 A1     Nov. 7, 2019

Related U.S. Application Data

(63) Continuation of application No. PCT/EP2018/050500, filed on Jan. 10, 2018.

(30) Foreign Application Priority Data

Jan. 16, 2017    (DE) ..................... 10 2017 100 743.1

(51) Int. Cl.
B23K 26/362        (2014.01)
B23K 26/06        (2014.01)
        (Continued)

(52) U.S. Cl.
CPC ........ B23K 26/362 (2013.01); B23K 26/0665 (2013.01); B23K 26/073 (2013.01);
        (Continued)

(58) Field of Classification Search
CPC .... B23K 26/57; B23K 2103/54; B23K 26/36; B23K 26/362; B23K 26/073;
        (Continued)

(56) References Cited

U.S. PATENT DOCUMENTS 5,400,147 A      3/1995  Korn et al.
6,372,394 B1 *   4/2002  Zientek .................. B23K 26/18
                                                          430/10

(Continued)

FOREIGN PATENT DOCUMENTS

DE          197 15 702 A1    10/1998
DE          693 19 479 T2     3/1999
        (Continued)

*Primary Examiner* — Chris Q Liu
(74) *Attorney, Agent, or Firm* — Muncy, Geissler, Olds & Lowe, P.C.

(57)        ABSTRACT

A method for producing recesses in a coating of transparent components of a lighting device, wherein the recess is produced by locally removing the coating using a laser beam. A first coating is removed on a front face of the component using a laser beam which is directed from the front face of the first coating onto the component, and a second coating is removed on an opposite rear face of the component using the same laser beam which is additionally directed from the front face onto the component and removes the second coating by passing through the transparent component.

6 Claims, 1 Drawing Sheet

(51) Int. Cl.
| | |
|---|---|
| *B23K 26/073* | (2006.01) |
| *B23K 26/082* | (2014.01) |
| *B23K 26/40* | (2014.01) |
| *B23K 26/57* | (2014.01) |

(52) U.S. Cl.
CPC ............ *B23K 26/082* (2015.10); *B23K 26/40* (2013.01); *B23K 26/57* (2015.10)

(58) Field of Classification Search
CPC ...... B23K 26/082; B23K 26/18; B23K 26/40; B23K 2103/16; B23K 2103/172; B23K 26/0619; B23K 26/0676; F21S 41/285; F21S 41/37; F21S 41/40; F21S 41/43; G09F 13/12; G09F 13/08
USPC ........................................ 219/121.67, 121.72
See application file for complete search history.

(56) References Cited

U.S. PATENT DOCUMENTS

| | | | |
|---|---|---|---|
| 10,309,605 B2 | 6/2019 | Schragl et al. | |
| 2007/0289957 A1* | 12/2007 | Eiterer | ............... B23K 26/0604 219/121.72 |

| | | | |
|---|---|---|---|
| 2010/0140630 A1* | 6/2010 | Hamaguchi | ......... H01L 33/0095 257/79 |
| 2011/0017280 A1* | 1/2011 | Rumsby | ................. B23K 26/40 438/69 |
| 2012/0169664 A1 | 7/2012 | Milne | |
| 2013/0319981 A1* | 12/2013 | Paganelli | ............... B23K 26/40 219/121.63 |
| 2015/0190882 A1* | 7/2015 | Ruettimann | ............ H01S 3/067 219/121.61 |
| 2015/0285457 A1* | 10/2015 | Erdl | .................... G02B 27/0933 362/513 |
| 2015/0370374 A1* | 12/2015 | Chan | ...................... B23K 26/18 174/255 |
| 2016/0059359 A1* | 3/2016 | Krueger | ............. B23K 26/0006 65/29.1 |
| 2017/0158551 A1* | 6/2017 | Bookbinder | ........... B23K 26/50 |

FOREIGN PATENT DOCUMENTS

| | | |
|---|---|---|
| DE | 299 21 059 U1 | 4/2000 |
| DE | 698 24 152 T2 | 1/2005 |
| WO | WO 2011/020721 A1 | 2/2011 |
| WO | WO 2013/084120 A1 | 6/2013 |
| WO | WO 2016/081967 A1 | 6/2016 |

* cited by examiner

METHOD AND DEVICE FOR PRODUCING RECESSES IN THE COATING OF TRANSPARENT COMPONENTS OF A LIGHTING DEVICE

This nonprovisional application is a continuation of International Application No. PCT/EP2018/050500, which was filed on Jan. 10, 2018, and which claims priority to German Patent Application No. 10 2017 100 743.1, which was filed in Germany on Jan. 16, 2017, and which are both herein incorporated by reference.

BACKGROUND OF THE INVENTION

Field of the Invention

The present invention relates to a method and a device for producing recesses in the coating of transparent components of a lighting device, wherein the recess is produced by locally removing the coating using a laser beam.

Description of the Background Art

By way of example, WO 2016/081967 A1 discloses a method for producing recesses in the coating of transparent components of a lighting device, for example, recesses in the reflecting surface within a reflector. The coating is first applied to the component over the entire surface using a surface coating process, for example, by vapor deposition, chrome plating, sputtering, or the like. The surface coating is then lasered out by focusing a laser beam on the coating and moving it over the surface so that the required recess area can be produced. The initially complete coating of the surface and subsequent removal of the coating in a local area on the surface thus form an effective alternative to the application of masks, which produce the recess by preventing the vapor deposition of coatings in the required recess area by means of the mask.

Recently, lighting devices for vehicles, for example, headlights, are provided with more and more lighting technology details, for example, lettering, logos, and the like, which are produced by recesses. If a component is coated and a recess is produced in the coating on the component, then, for example, light can only pass through the recess area. Thus, light gadgets can be produced, wherein for the passage of light through components which extend approximately in a flat fashion, it is necessary to produce the recesses in the coating on both faces of the component. The coatings are usually vapor deposited in a cavity, so that the coating is deposited on both surfaces of the component through which the light is to pass in the local region. The use of masks, templates, and the like is not always possible because extremely complex geometries often preclude a template method or mask method. Consequently, it is desirable to provide a coating locally with recesses on both faces on a component in the easiest manner possible.

SUMMARY OF THE INVENTION

It is therefore an object of the present invention to provide a method for producing recesses in the coating of transparent components, which can be easily performed and can provide complex component structures with recesses. Furthermore, a corresponding device is required for this by which the method can be performed.

The method of the invention provides the following steps: removing a first coating on a front face of the component using a laser beam which is directed from the front face of the first coating onto the component, and removing a second coating on an opposite rear face of the component using the same laser beam which is additionally directed from the front face onto the component and removes the second coating by passing through the transparent component.

The method of the invention offers the advantage that complex geometries of transparent components can also be provided with recesses, wherein the recess can be produced on both faces of the component extending in a substantially flat fashion. The advantage is possible in particular because the laser beam is not absorbed by the material of the transparent component and the absorption takes place only on the coating itself. In this case, it is also possible to focus the laser beam from the material itself onto the coating, so that the coating can also be removed on a face of the component opposite the laser irradiation face. As a result, recesses in complex geometries of components are possible, such as screens, trim frames, design elements, and the like in the headlight of a vehicle, which forms the lighting device.

The method of the invention is characterized in particular by the fact that to remove the first coating, the laser beam is focused on the front face of the component. In the same way, to remove the second coating, the laser beam is focused on the rear face of the component. In order to be able to pass the laser beam through the transparent component, the method is characterized in particular by the fact that the laser beam is generated by means of a laser beam source which generates the laser beam with a wavelength that is transparent to the component. In this case, it is not necessary that there is no absorption of the laser beam in the component, but the absorption should be substantially so low that the laser beam on the back of the component as well still has a sufficiently high energy to perform the removal of the coating.

In order to produce the geometry of the recess, it is advantageous if the laser beam is deflected with a scanner system or it can be provided that the laser beam source is moved with a motion system, so that the recess with a required shape is produced on the front and rear face of the component by moving the laser beam, in particular wherein both recesses are produced with the same shape.

A further advantage is achieved when the removal of the coating on the front face and on the opposite rear face of the component is carried out in a single clamping of the component in a mounting system. As a result, set-up times of the component in the mounting system can be reduced, and a particular advantage arises when the mounting system from the coating process can already be used to employ the laser so as to produce the recesses on both faces of the component.

To change the focusing of the laser beam from the front to the rear face of the component, the focusing of the laser beam can be changed by means of focusing optics or it is possible to reposition the laser beam source or the component accordingly, namely by the amount of the component thickness. Thus, the laser beam focus can be moved from one surface to the other surface, wherein the laser beam refraction processes through the component's material must be taken into account.

The invention is directed further to a device for producing recesses in the coating of transparent components of a lighting device for carrying out the method of the invention. In this respect, the device is suitable for focusing the laser beam both on the first surface and on the second surface, for example, by means of a suitable traveling system.

The device comprises a laser beam source for generating the laser beam, wherein the distance of the laser beam source to the component is adjustable such that the laser beam can be focused on a front face of the component for removing a first coating and can be focused on a rear face of the component for removing a further, second coating. The device in particular comprises an arrangement of the laser relative to the component such that focusing on the first and second surface is made possible. Further, the device comprises a suitable mounting system for mounting the component.

According to a further advantageous embodiment of the device of the invention, the component is taken up in a mounting system, which is set up such that the first coating and the second coating can be removed in a single clamping of the component.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
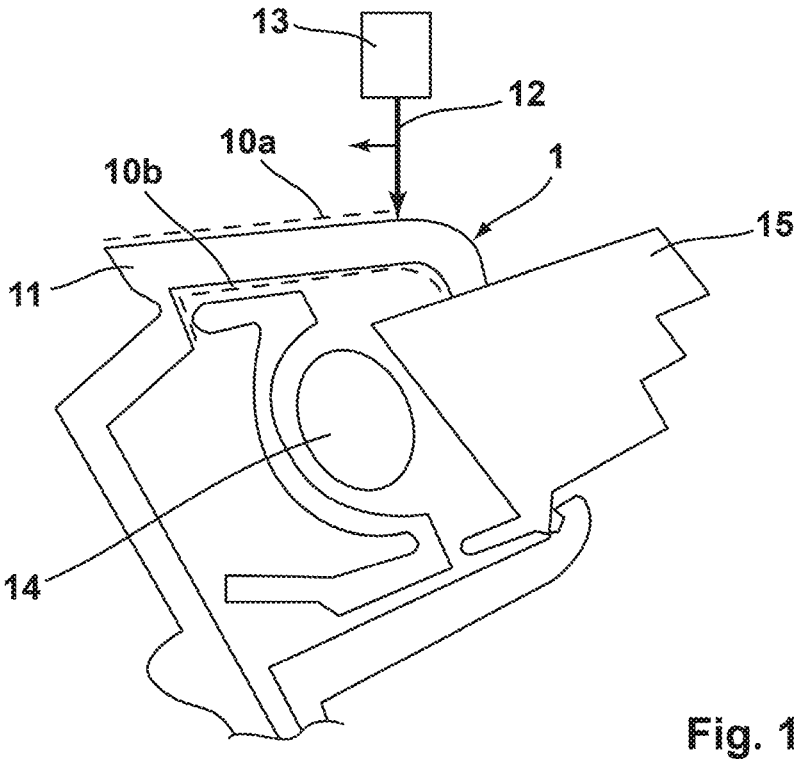
FIG. 1 is a cross-sectional view of a component with a coating on a front and rear face, wherein a laser beam performs a removal of a coating on a front face.
Figure 2:
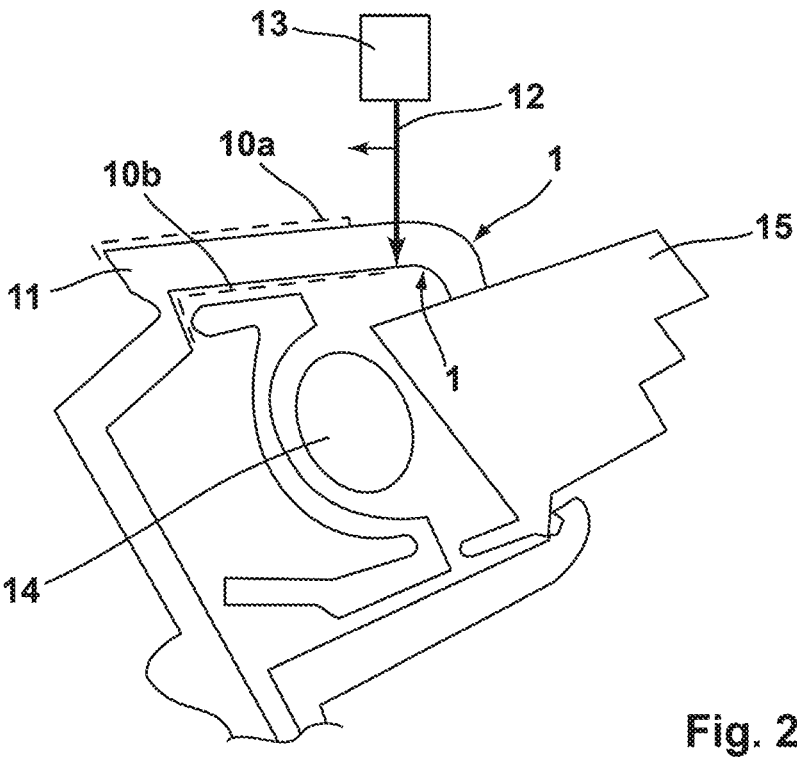
FIG. 2 shows the view of the example according to FIG. 1 for carrying out the method, wherein the laser is focused on the rear face of the component to remove the second coating.

FIGS. 1 and 2 each show an exemplary embodiment for producing recesses 1 on the surfaces of a component 11, for which a laser beam 12 is used which is generated by a laser beam source 13. The illustrated component 11 forms, for example, a trim frame of a headlight, and there is a light guide body 14 below the trim frame, said light guide body which emits light, passing through component 11, out of the entire system. If recesses 1 are produced in first coating 10*a* on the front face of component 11 and in second coating 10*b* on the opposite rear face of component 11, light generated by light guide body 14 can pass through recesses 1 whereas remaining coatings 10*a* and 10*b* are not transparent. Thus, light gadgets can be produced, for example, the manufacturer's lettering or logos.

Starting with FIG. 1, the method is carried out by first removing first coating 10*a* on the front face of component 11 using laser beam 12. For this purpose, the laser beam is operated, for example, in the pulse mode and is focused on the front face of component 11. An arrow indicates a movement of laser beam 12, for example, generated by a relative movement of laser beam source 13 to component 11 or by a scanner system in laser beam source 13. If recess 1 is produced on the front face of component 11, and coating 10*a* was produced to form recess 1 on the front face, then in an intermediate step, laser beam 12 is focused from the front face of component 11 onto the rear face of component 11.

FIG. 2 shows the removal of coating 10*b* on the rear face of component 11, wherein laser beam 12 can be passed through transparent component 11 through recess 1, first produced according to FIG. 1, onto the front face of the component. In this case, a removal of rear coating 10*b* can also take place when laser beam 12 passes through component 11.

As a result, the method of the invention makes it possible to simply remove coatings 10*a* and 10*b* on two opposite faces of a component 11, without component 11 having to be re-clamped from the first to the second face of component 11 to change the removal. The particular advantage lies in the fact that both coatings 10*a* and 10*b* can be removed in a single clamping of component 11 using laser beam 12. In particular, it is possible to provide very complex geometries of component 11 with recesses 1, for example, as shown in component 11 with a curvature adjacent to a further component 15.

The invention is not limited in its execution to the preferred exemplary embodiment described above. Rather, a number of variants are conceivable which make use of the illustrated solution in fundamentally different embodiments as well. All features and/or advantages emerging from the claims, the description, or the drawings, including structural details, spatial arrangements, and process steps, can be essential to the invention both alone and in the most diverse combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method, comprising:

producing recesses in a coating, the coating including a first coating and a second coating, of a transparent frame surrounding a light guide body of a vehicle headlight, the coating having been deposited on the frame, the recesses being produced by locally removing the coating using a laser beam generated by a single laser beam source, said producing recesses comprising:

removing the first coating on a front face of the frame using the laser beam that is directed from a front face of the first coating onto the frame to produce recesses in the first coating;

removing the second coating on an opposite rear face of the frame using the laser beam that is subsequently directed from the front face of the first coating onto the frame and removes the second coating by passing through the frame by subsequently directing the laser beam through recesses formed in the first coating; and adjusting the distance of the laser beam source to the frame such that the laser beam is focused on the front face of the frame for removing the first coating and is focused on the rear face of the frame for removing the second coating, wherein the laser beam is deflected using a scanner system so that recesses are produced on the front and rear face of the frame, wherein the first coating and the second coating are removed in a single clamping of the frame, wherein the laser beam is not absorbed by a material of the transparent frame and the laser beam is only absorbed by the coating, and wherein the recesses produced on the front and rear face of the frame are produced with a same shape.

2. The method according to claim 1, wherein, to remove the first coating, the laser beam is focused on the front face of the frame.

3. The method according to claim 1, wherein, to remove the second coating, the laser beam is focused on the rear face of the frame.

4. The method according to claim 1, wherein the laser beam is generated by a laser beam source which generates the laser beam with a wavelength that is transparent to the frame.

5. The method according to claim 1, wherein a material of the coating is different from a material of the transparent frame.

6. The method according to claim 1, wherein the coating is not transparent.

* * * * *